(12) United States Patent
Larsson et al.

(10) Patent No.: US 7,684,971 B1
(45) Date of Patent: Mar. 23, 2010

(54) METHOD AND SYSTEM FOR IMPROVING SIMULATION PERFORMANCE

(75) Inventors: Fredrik Larsson, Solna (SE); Bengt Werner, Akersberga (SE)

(73) Assignee: Virtutech AB (SE)

( * ) Notice: Subject to any disclaimer, the term of this patent is extended or adjusted under 35 U.S.C. 154(b) by 431 days.

(21) Appl. No.: 10/907,343

(22) Filed: Mar. 30, 2005

Related U.S. Application Data

(60) Provisional application No. 60/521,309, filed on Mar. 30, 2004.

(51) Int. Cl.
 *G06F 9/45* (2006.01)
(52) U.S. Cl. .......................................... 703/22; 717/135
(58) Field of Classification Search .................... 703/22; 717/135
 See application file for complete search history.

(56) References Cited

U.S. PATENT DOCUMENTS

| 4,656,580 | A | * | 4/1987 | Hitchcock et al. | ............. | 703/19 |
| 5,696,942 | A | * | 12/1997 | Palnitkar et al. | ............. | 703/17 |
| 7,219,047 | B2 | * | 5/2007 | Cohen et al. | ................. | 703/17 |
| 7,343,590 | B2 | * | 3/2008 | Tormey et al. | ............. | 717/131 |

OTHER PUBLICATIONS

Eric C. Schnarr et al.; "Facile: A Language and Compiler for High-Performance Processor Simulators", 2001, Proceedings of the ACM SIGPLAN 2001 conference on Programming Language Design and Implementation, pp. 321-331.*

Toshio Suganuma et al.; "A Dynamic Optimization Framework for a Java Just-In-Time Compiler", 2001, Proceedings of the 16th ACM SIGPLAN conference on Object oriented programming, systems, languages, and applications, pp. 180-194.*

M. Rosenblum et al.; "Complete Computer System Simulation: The SimOS Approach", 1995, IEEE Parallel & Distributed Technology: Systems & Applications, vol. 3, Issue 4, pp. 34-43.*

IEEE 100 The Authoritative Dictionary of IEEE Standards Terms, seventh edition, 2000, Institute of Electrical and Electronics Engineers, p. 1102.*

(Continued)

*Primary Examiner*—Paul L Rodriguez
*Assistant Examiner*—Russ Guill
(74) *Attorney, Agent, or Firm*—Thompson & Knight LLP; James J. Murphy

(57) ABSTRACT

The invention is a technique that allows very efficient execution of an instruction set simulator (ISS) when certain code fragments are simulated. They occur frequently in operating systems, when a processor waits for something to occur. These loops perform very little, if any, computation. An automatic analysis of the code fragments is performed to determine whether they can be transformed to "fast forward" when execution loops through the code fragment. This is done by the creation of a function g, that takes a number of state changes as an input and can compute the state at a time T by a single application of the function, rather than applying the next state function repeatedly until time T is reached. An important aspect of the resulting optimization is that it produces exactly the same simulated result as compared to when it is not applied, i.e. the optimization is non-intrusive.

19 Claims, 2 Drawing Sheets

OTHER PUBLICATIONS

Neil D. Jones; "An introduction to partial evaluation", 1996, ACM Computing Surveys, vol. 28, Issue 3, pp. 480-503.*

David F. Bacon et al.; "Compiler transformations for high-performance computing", 1994, ACM Computing Surveys, vol. 26, Issue 4, pp. 345-420.*

M. Anton Ertl et al., "vmgen—A Generator of Efficient Virtual Machine Interpreters", 2002, Software—Practice and Experience, vol. 32, pp. 1-32; teaches superinstructions that are functionally equivalent to a function that provides accelerated advancement of a state function.*

* cited by examiner

METHOD AND SYSTEM FOR IMPROVING SIMULATION PERFORMANCE

RELATED PATENT APPLICATIONS

This application claims the benefit of a U.S. Provisional Application No. 60/521,309 filed on Mar. 30, 2004.

FIELD OF THE INVENTION

The present invention relates generally to software based computer system simulators and, more particularly, to improving simulation performance by analyzing the past execution of simulated instruction code loops in order to accelerate the advancement through the code loops when they are subsequently executed.

BACKGROUND OF THE INVENTION

The use of simulation systems for developing computer systems and software has shown to provide tremendous advantages in terms of time savings and cost. More recently, the technique of full system simulation has gained more attention as advances in processor speeds of contemporary host computer platforms enable good simulation of detailed hardware models in computer system architectures. System simulation provides a virtual computer with the capability to create functional models of CPUs with supporting chips in sufficient detail to execute native object code without modification. Furthermore, simulation provides the significant advantage of enabling developers to develop and test their software applications and hardware products on high-end systems without having to use actual hardware with its associated expense or unavailable hardware still under development.

Simulation offers benefits for software development where it can arbitrarily parameterize, control, and inspect the computer system it is modeling and provide measurements that are non-intrusive and deterministic. It also provides a basis for automation where multiple simulator sessions can run in parallel and sessions can be fully scripted using performance monitors. For example, the software can be combined with the virtual systems in a way that facilitates modeling of the processor, disk access, memory access, cache configuration, and memory system bus and other parameters. With full system simulation, the operating system, device drivers, and application software cannot tell whether they are running on real hardware or in the simulated environment. Maximum flexibility is obtained using the simulated environment with the ability to change the parameters to suit a particular testing environment while performing comprehensive data collection and execution and performance tracking.

An important issue relating to simulation systems is that of performance i.e. a tradeoff must typically be made between the accuracy of simulating the system as closely as possible versus a performance level that is acceptable. Creating a more realistic simulation workload environment generally comes at the expense of time and cost to deal with specification inaccuracies and implementation errors. One area that has a significant affect on performance relates to the execution of code fragments that, for example, typically occur frequently in operating systems. These code fragments usually consist of loops that are run when a processor waits for something to occur. Often, when these loops are executed they perform very little, if any, computation at all. Therefore, it would seem desirable to improve simulation performance by skipping the execution of these code loops to arrive at the end of the loop directly. However, this is not always trivial because an important objective is to simulate as closely as possible all execution steps of the real hardware environment. Hence, eliminating the execution of some code fragment loops may lead to a result that may not correspond accurately to what is run on real hardware. It therefore is important to be able to maintain equivalence between the number of instructions executed in the simulated environment versus the instructions run on the real hardware, and maintaining a fixed ratio with respect to the amount of virtual time that has elapsed versus real time on the hardware.

In view of the foregoing, it is desirable to improve simulation performance by optimizing the execution of instructions in an instruction set simulator (ISS) in a manner that is efficient and non-intrusive, i.e. produces the same simulated result and consumes the same amount of virtual time as compared to running an unmodified simulator.

SUMMARY OF THE INVENTION

Briefly described and in accordance with the embodiments and related features of the invention, there is provided a method, system and computer program code for improving the simulation performance in software of a digital computer system environment by providing an algorithm for "fast forwarding" through the execution of simulation instructions that allows efficient execution of an instruction set simulator (ISS) when certain code fragments are simulated. The instructions or code fragments of a simulation session are analyzed during execution in which the frequency of execution is compared to a predetermined threshold. If the frequency of execution exceeds the threshold the simulator starts collecting the state changes relating to the instructions or code fragments. The instructions or code fragments that are identified to indicate a potential candidate for "fast forwarding" in which a function g is generated to be applied to the next and subsequent times the identified instructions or code fragments are executed. The direct application of function g at a future time T provides accelerated advancement through the code fragments to improve the simulation performance. The optimization technique is non-intrusive in that it produces the same result when compared to not running the optimization algorithm i.e. when the next state function is repeatedly applied instead until time T is reached.

BRIEF DESCRIPTION OF THE DRAWINGS

The invention, together with further objectives and advantages thereof, may best be understood by reference to the following description taken in conjunction with the accompanying drawings in which.

DETAILED DESCRIPTION OF THE INVENTION

In accordance with an embodiment of the invention, simulation performance is improved by implementing a technique for efficient execution of an instruction set simulator (ISS) when certain code fragments are simulated. These code fragments typically occur frequently in operating systems, which typically consist of loops that are run while a processor waits for something to occur. These loops perform very little, if any, computation while the processor is in idle mode. In the embodiment, an automatic analysis of the code fragments is performed to determine whether they can be transformed in such a way that simulation is "fast forwarded" when execution loops through the code fragment.

In accordance with the invention the notion of "fast forwarding" relates to creating a function g, that takes the number of state changes as input and can compute the state at time T by applying g once, rather than applying the next state function repeatedly until time T is reached as is typically the case. If the ISS can be optimized for these loops a substantial gain in performance can be achieved, especially when simulating multi-processor machines or networks of many computers, for example. Since systems typically spend a lot of time in loops such as these, the optimization of executing code fragments can greatly improve simulation performance. An important aspect of the technique is that running the optimized code produces exactly the same simulated result as compared to running the unmodified code, making the technique non-intrusive.

A significant component of an ISS is an interpreter core that performs the semantics of each target instruction, one at a time. The interpreter core fetches the instruction pointed out by the program counter and decodes the instruction to decide what operation it should perform and on what simulated registers and memory addresses it should operate on. The instruction also defines what the new program counter value is. The interpreter core calculates this and the loop can begin again fetching the next instruction.

Figure 1:
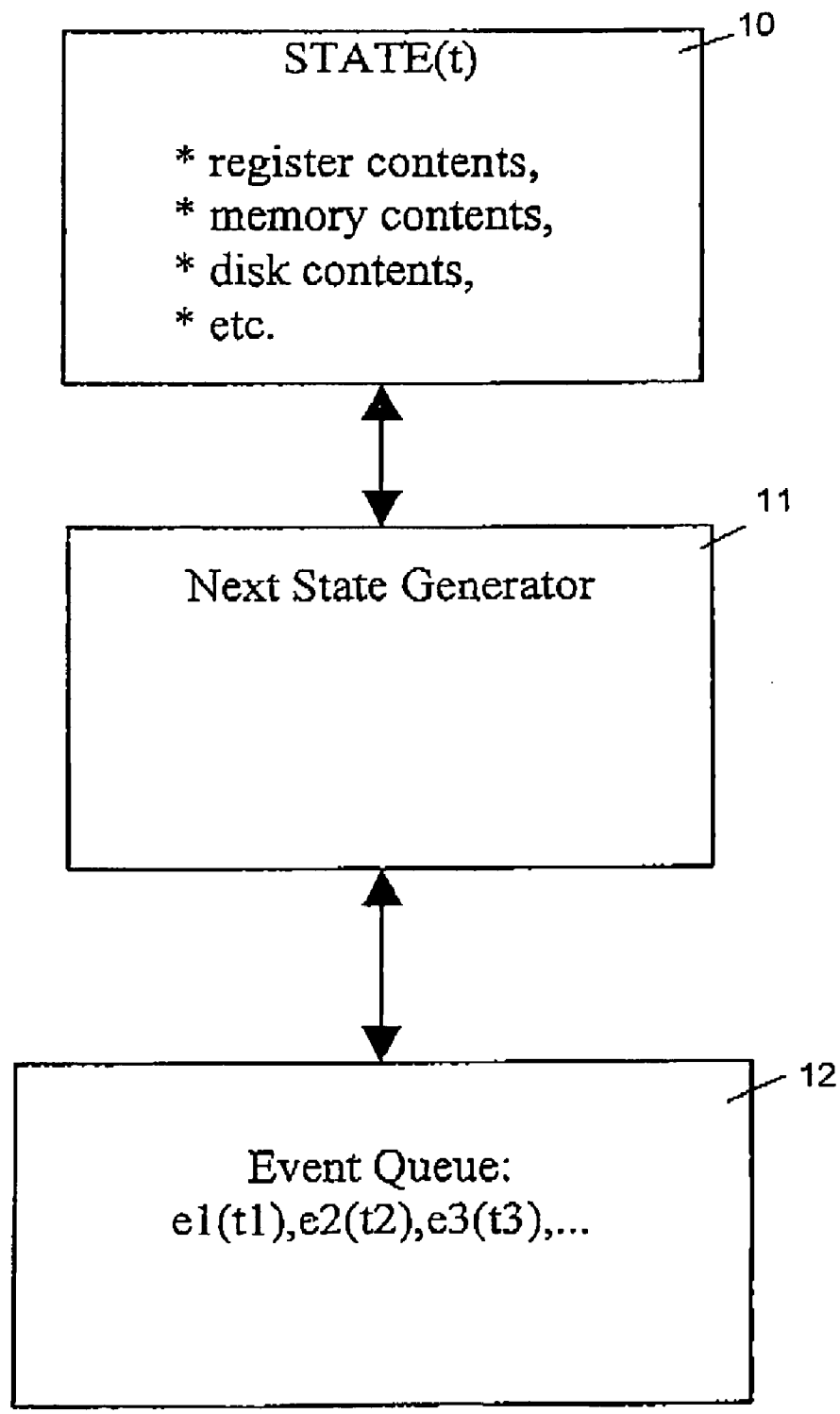
FIG. 1 illustrating exemplary an instruction set simulator.

A target instruction is an instruction in the architecture we are simulating. By way of example, consider the block diagram in FIG. 1 illustrating exemplary an instruction set simulator. The block labeled STATE 10 includes all states in the simulated machine at time t i.e. s(t), for example, the register contents, the memory contents, disk contents all at time t etc.

Block 12 is an Event Queue (EQ) that illustrates an infinite queue of events (event queue) that will occur in future that are represented as $e_n(t_n)$. These are typically events that interrupt the normal instruction execution, such as an interrupt from a device, timer, or another processor. The events are ordered chronologically such that if event e1 occurs at time t1 then the next event e2 will occur at time t2 where t2>t1.

The Next State Generator (NSG) 11 takes the STATE and produces a new state STATE' by simulating the next instruction. This also advances the time t one unit. If the time of the first event is equal to the current time, that event is executed instead of the next instruction. A common event is transferring the execution of the simulated machine to an interrupt handler. When the interrupt handler is finished the execution will return to the interrupted instruction and execution will continue there. Certain instructions may also insert new events into the event queue. Instruction execution is far more frequent then events. There are usually thousands of instructions per event.

Influence by an external NSG is done through events in, for example, a multi-processor system where there is one NSG per processor.

When the simulation progresses a series of states s(t), s(t+1), s(t+2), ... are generated, where s(t) represents the state at time t and e(t) represents an event that should occur at time t. The NSG can be viewed as a function f from a state s(t) and an event e(t_first), where t_first is the time of the first event, to a new state s(t+1) and possibly new events in future. The event is served only if t is equal to t_first.

f(s(t), e(t_first))→s(t+1), e(tf1), e(tf2), ..., e(tfn) where tf1>t

If a new event e(tf), is created where tf<t_first, e(tf) is inserted before e(t_first) and tf becomes the new t_first.

There exists many techniques for speeding up an ISS, or the interpreter. The most common technique is to consider a block of several instructions as a single state change i.e. a super state change.

b(s(t), e(t_first))→s(t+I), e(tf1), e(tf2), ..., e(tfn)

where tf1>t_first, and I the number of instructions in a the block

In this way the interpreter overhead is reduced and only the resulting state change needs to be computed. Furthermore, many of the intermediate state changes may be avoided if they update the same data. Hence, it follows that b is less costly in terms of computing resources to compute than applying f on all intermediate states:

f( ... f(f(f(s(t), e(t_first)), e(t_first)), e(t_first)))→
s(t+I), e(tf1), e(tf2), ..., e(tfn)

In order for this technique to be efficient no events are usually allowed between the instructions in a block, i.e. the time to the first event should be greater than the number of instructions in the block. If this is not the case the instructions are simulated one at a time until the block is finished by using f. There exist both static and dynamic approaches of this technique. In the static approach all the super state changes are created before the simulation is started and compiled into the simulator. In the dynamic approach the super state changes are created while the simulator run. It has been found that the dynamic approach generally gives better performance, as shown in "Optimizing Indirect Branch Prediction Accuracy in Virtual Machine Interpreters", M. Anton Ertl and David Gregg, Proc. of the ACM SIGPLAN 2003 conference on Programming language design and implementation, P. 278-288, 2003. A common dynamic technique is called binary translation or just in time (JIT) compilation where several target instructions are translated into native instructions that runs directly on the host, where it is the host computer that runs the simulator. An exemplary demonstration of the dynamic technique can be found in "Fast and Flexible Machine Simulation", by Emmett Witchel and Mendel Rosenblum, Proceedings of the 1996 ACM SIGMETRICS international conference on Measurement and modeling of computer systems, P. 68-79, 1996.

Hyper Simulation

The embodiment of the present invention enables simulation performance to be considerably sped up and can be used together with the techniques described above. The invention involves automatically creating and using a function g that takes a state at time t and a new time T where T>t and produce a new state s(T). A key point is that g can be evaluated in constant time. Hence g will be much easier to compute than applying f on all states from t to T (or b on all super states from t to T) thereby demanding much less in the way of computational resources. The greater the difference of (T−t) the greater the performance benefit is. The function g differs from the block translation described above in that it allows the execution to loop over that same code. To allow arbitrary large values of T it requires the execution to have a cyclic behavior. Thus, g(s(t), T)→
s(T), e(tf1), e(tf2), ..., e(tfn) where t<T<=t_max<t_first Here the general restriction on T is that T should be less than the time of the first event. However, depending on how g is constructed and which code fragment g computes, g may have other restrictions on T. For example if g computes the state change of running a loop the loop conditions must be obeyed, i.e. the loop may exit before t_first is encountered. Therefore, t_max is defined to be the maximum value of T for g and t_max is computed by another function m:

t_max=m(s(t), t_first) where t_max<t_first

Although it is possible to define g to avoid generating any new events, and g can be written as:

$g(s(t), T) \rightarrow s(T)$ where $t < T < t\_max$

Finding a suitable g function for a general state is unlikely as g can only be found if little or no computation is being done in the state transitions following s(t). Therefore we can use f(or b) for all states where it is hard to find a g. We also define a function h which checks if a state s(t) is a candidate of applying the g function on. Although the function g is constant over time it takes only a small amount of overhead to invoke it, even though a constant function still takes time to compute. For small values of (T−t) it may be more efficient to use f(or b). Therefore h also uses m to check that t_max is large enough so that an invocation of the function g for a sufficiently large T will not provide a performance loss. Generally the T used will be the largest possible, i.e. t_max, since this will result in the maximum performance.

$h(s(t), t\_first) \rightarrow \{true, false\}$ where, h will be used to determine whether g should be invoked or not.

The states that will most likely succeed in finding a g for are typically found where a loop is executed. Some loops have the behavior that is sought after, i.e. they compute something that is only a function of time, where in an ISS is usually proportional to the number of instructions executed or the number of iterations in the loop. In an operating system idle loops are good examples of such loops.

When a g function is constructed for a given code fragment the following should be true:
- there is full knowledge about all instructions in the code fragment and which events they may generate.
- it is known that event cannot be generated in any other way.
- the entire fragment computes a small state change. It should be noted that there may be values computed during the loop that are not saved after an iteration.
- the fragment has a cyclic behavior, i.e. the execution performs a nested loop and the control flow inside the loop can be predicted.
- the computed data should be a function of time (number of executed instructions) in the fragment.
- the fragment is executed frequently.

g, h and m may be created by hand or by the simulator itself by using statistics of frequently executed instructions and a good analyzing algorithm.

Figure 2:
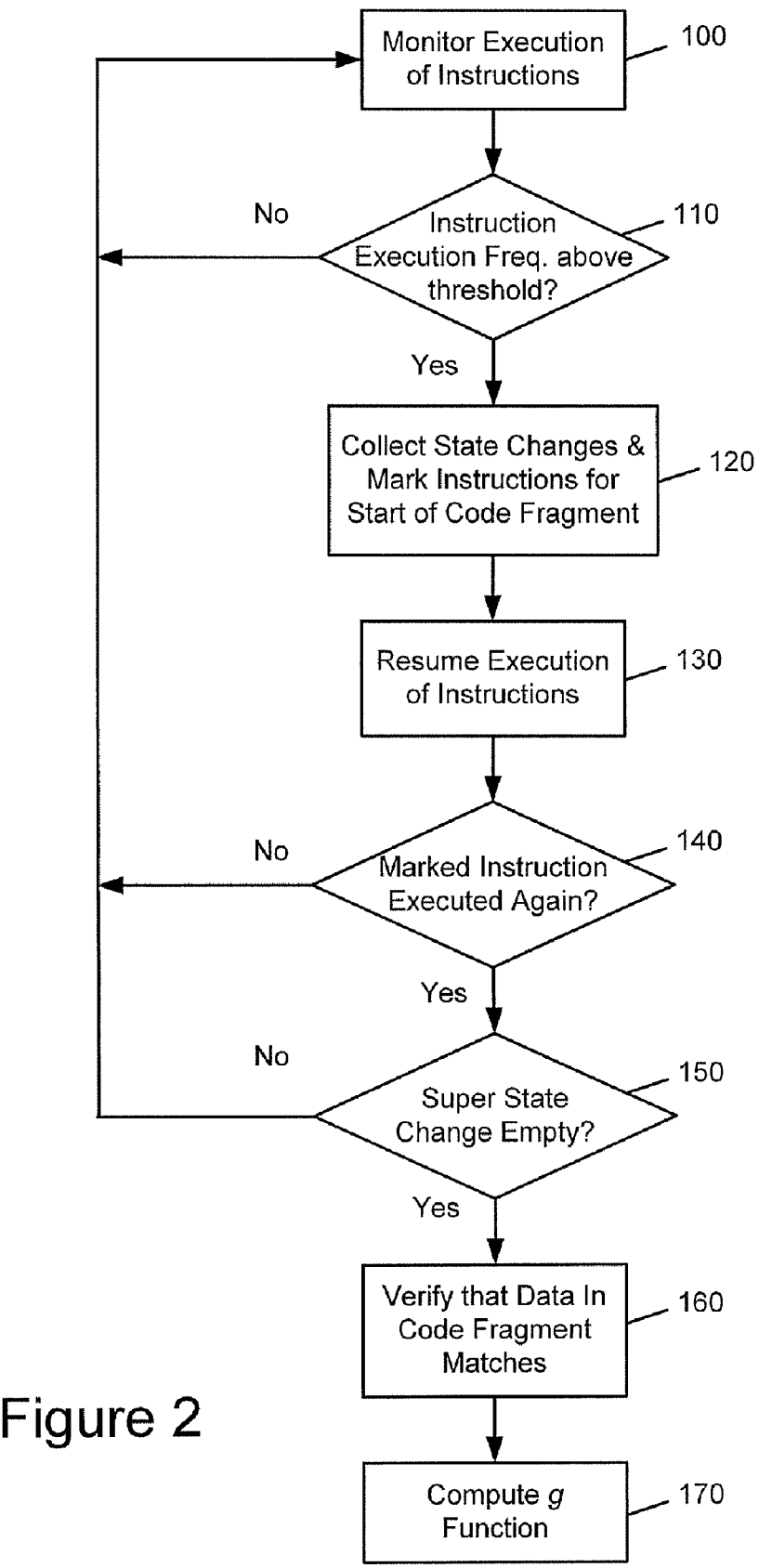
FIG. 2 shows an exemplary flow diagram of the analyzing algorithm operating in accordance with the embodiment.

FIG. 2 shows an exemplary flow diagram of the analyzing algorithm operating in accordance with the embodiment. In step 100, the execution of simulated instructions is monitored to determine whether certain instructions or groups of instructions (code fragments) would be good candidates for optimization where a function g is run instead of the code fragments. When the same instruction has an execution frequency that exceeds a certain threshold as shown in step 110, the simulator starts collecting state changes and the instruction is marked as a possible start of a good code fragment, as shown in step 120. For example, the threshold is set at a high enough level where the state collection does not give any significant performance decrease when compared to when it is not collecting any state traces.

The execution of instructions resumes in step 130 such that when the simulator returns to the previously marked instructions in step 140, all state changes are analyzed if the state changes do not compute anything, i.e. the super state change is empty except that time has elapsed and a usable fragment was found, as shown by step 150. In this case m will be created to return t_first, and h will be created to check that all the data that was used in the code fragment matches the data at the time when the marked instruction was first encountered, as shown by step 160. All instructions in the fragment are also checked so that none of them can create new events. In this case the g function will be simple to determine since it will not be involved in any computation, and it is applied to the identified code fragment such that subsequent execution is accelerated under certain conditions, as shown in step 170.

The analyzing algorithm can be extended to analyze what each instruction in the loop does. If there is a small state change each loop iteration this can be detected and a g can be constructed to compute the state change for an arbitrary number of loop iterations. Moreover, it must also make sure that the loop conditions are fulfilled.

A g, h, and m should be constructed to work on each suitable loop or any other code that can be translated into a constant function.

The following algorithm shows how to use g:
if h(s(t), t_first) is true then
    t_max=m(s(t), t_first)
    s(t+t_max)=g(s(t), t_max)
    t=t+t_max
else
    s(t+1), new events=f(s(t), e(t_first))
    t=t+1

EXAMPLE

Consider the following C-program:
while(r1<r2) {
*a1=r1;
r1++;
}
which can be translated into the following pseudo machine code P:

| 1 sub r1, r2 -> r3 | # move r1 − r2 to r3 |
| 2 bgez r3, 6 | # if r3 >= 0 exit the loop |
| 3 store r1 -> [ a1 ] | # save r1 at address a1 in memory |
| 4 add r1, 1 -> r1 | # increase r1 |
| 5 ba 1 | # jump to loop head |
| 6 | |

P is a loop that will increase a register r1 in each iteration and store it at address a1 in memory as long as r1 is less than r2.

A state that represents a machine that executes P would include a program counter PC, register r1, r2 and a1, and the memory contents M. Where M[A] refers to the data at memory location A in memory M. And where M[1] to M[5] contains P, denoted M[1 . . . 5]=P. Time t is 1 at the beginning. The only events that exist are timer interrupts marked as I. If an interrupt occurs the execution will immediately be transferred to an interrupt handler. When the interrupt handler is finished the execution will return to the interrupted instruction and execution will continue from there. For simplicity, the code for the time interrupt handler is not shown in the example.

Let the initial state be:
t=1: s(1)=(PC=1, r1=0, r2=10, a1=100, M[1-5]=P, M[100]=0)
and the initial EQ:
e(47)=I, e(1248)=I, . . . (t_first is 47)
where t is the current time which is set to 1.

A new state is denoted as s(t)+X where X is a modification to s(t). For example s(t)+r1=7 means a new state where r1 has a new value 7.

f is defined in pseudo code as:
f(s(t), e(t_first))
if e(t_first)=t
return s(t)+PC=address of interrupt handler e(new_t_first)
...
else
if M[PC]=sub r1,r2→r3 then
return s(t)+(r3=r1−r2,PC=PC+1)
if M[PC]=bgez r3, a then
if r3>=0 then
   return s(t)+PC=a
   else
   return s(t)+PC=PC+1
  if M[PC]=store r1→[a] then
return s(t)+(PC=PC+1,M[a]=r1)
if M[PC]=add r1,i→r2 then
return s(t)+(r2=r1+i,PC=PC+1)
if M[PC]=ba a then
return s(t)+PC=a
...
more instructions follow but are not shown
m is defined as follows (and "/" is integer division):
m(s(t), t_first)=
iterations=min((t_first−t)/5, r2−r1);
return t+iterations*5 m calculates the minimum of the number of iterations of the loops that will be executed before any interrupts occur, and the number of iterations of the loops that will be executed while the condition r1<r2 still holds. Then t_max is returned.
h is then:
h(s(t), t_first)=
if PC=1 and M[1 ... 5]=P and r1<r2 and m(s(t), t_first)>t+10 then
  true
else
  false h checks that PC is at the beginning of P and that P is unmodified and that r1 is less than r2 so that we will enter the loop. Here h also uses m to calculate a t_max for g and asserts that t_max will include at least two iterations of the loop. It is assumed that using g for only one iteration will not provide a notable performance boost. Also it is known by h that P will not insert any events in EQ, since there are no instructions in P that could do so. Hence h can then conclude that at least one iteration of the loop will be executed and that the state is suitable for applying g.
g can be defined as follows:
g(s(t), t_max)=
i=t_max/5
r1=r1+i
r3=r1−1−r2;
M[a1]=r1;
return s(t_max)

g calculates the number of iterations i and adjusts r1, r3, and M[a1] to the their values after that many iterations. This function is constant to evaluate. In the example the first interrupt occurs at t+47 and r2−r1=10, thus t_max will be min(47/5,10)*5=min(9,10)*5=45. The max number of iterations will be 45/5=9 and r1 will be set to 9, r3 to −2, M[a1]. For simplicity m returns a t_max of an even number of loop iterations. Although this is not necessary it makes g a lot simpler. It should be noted that instead of letting m compute t_max it is possible to compute the max number of iterations instead, and doing so would make both m and g even simpler still.

In the example above a Memory Management Unit (MMU) has been left out this could have been added to the state rather easily. We define MMU[VA]=PA to be a virtual address to a physical address. Hence MMU[1]=1, MMU[2]==2, ... MMU[100]=100 can be added to the state and h could be augmented with a check for this.

The foregoing description of the preferred embodiments of the invention has been presented for purposes of illustration and description. It is not intended to be exhaustive or to limit the invention to the precise forms disclosed, since many modifications or variations thereof are possible in light of the above teaching. Accordingly, it is to be understood that such modifications and variations are believed to fall within the scope of the invention. The embodiment was chosen to explain the principles of the invention and its practical application, thereby enabling those skilled in the art to utilize the invention for the particular use contemplated. In particular, although the invention is described with reference to simulating a digital computer system environment, the invention is applicable to simulating other environments for purpose of software development and testing, for example. It is therefore the intention that the following claims not be given a restrictive interpretation but should be viewed to encompass variations and modifications that are derived from the inventive subject matter disclosed.

What is claimed:

1. A method of improving the performance of a software simulator for use in simulating a digital computer system by providing a technique for "fast forwarding" through the execution of instructions or code fragments to a certain time T, comprising:
running the software simulator on a processor to simulate a state of the digital computer system and provide simulation results accessible by a user, including:
determining, with the processor, a frequency of execution of each instruction or code fragment of a set of instructions or code fragments of a simulation session;
comparing, with the processor, the determined frequency of execution of each instruction or code fragment to a predetermined threshold, and if the frequency of execution exceeds the threshold for that instruction or code fragment, collecting state changes relating to that instruction or code fragment and marking that instruction or code fragment;
identifying, with the processor, marked instructions or code fragments as potential candidates for "fast forwarding" to the certain time T by analyzing the corresponding collected state changes related to those marked instructions or code fragments and determining that the execution of those marked instructions or code fragments is cyclic; and
generating, with the processor, a function g to be applied next and subsequent times the identified instructions or code fragments are executed in which application of function g at a certain time t provides accelerated advancement through the code fragments and produces the same result when compared to applying a next state function repeatedly until time T is reached, wherein the function g is generated by computing state changes from a state s(t) from execution of a code fragment and events that will occur in future en(tn), where en represents an event occurring at time tn and n is an integer index such that a time t2 is greater than a time t1.

2. The method according to claim 1 wherein, a function m is generated to calculate the minimum of a number of iterations of loops of the code fragments that will be executed before any interrupts occur such that t max is determined which is the maximum value of T for which the function g is applied and conditions are fulfilled when a loop is exited.

3. The method according to claim 2 wherein, a function h is generated using the function m for determining whether the state s(t) is a suitable candidate for applying the function g on.

4. The method according to claim 3 wherein, the state s(t) comprises all states in the simulated digital computer system at time t, which includes register contents at time t, memory contents at time t, and disk contents at time t.

5. The method according to claim 1 wherein, a Next State Generator (NSG) generates a new state s'(t) from a previous state s(t) by simulating a next instruction.

6. The method according to claim 1 wherein, the events en(tn) are stored in an event queue (EQ) comprising a plurality of queue of events that will occur in the future.

7. The method according to claim 1 wherein, the method is extended to analyze each instruction in a code fragment loop such that if there is a state change each loop iteration, this can be detected and a g function can be constructed to compute the state change for an arbitrary number of loop iterations provided that loop conditions are fulfilled.

8. The method according to claim 3 wherein, a memory management unit MMU that defines a mapping of a virtual address to a physical address is added to the state s(t), and wherein the function h is adapted to check the MMU.

9. The method according to claim 3 wherein, the predetermined threshold is calculated by setting it to a level high enough to where the simulator performance is not decreased compared to when the simulator is not collecting state traces.

10. A system executing computer program code for simulating in software a digital computer system in which execution performance of simulation instructions is improved by "fast forwarding" through the execution of code instructions and code fragments when advantageous, the system comprising:
a processor including:
means for determining a frequency of execution of each instruction or code fragment of a set of code instructions or code fragments of a simulation session;
means for comparing the determined frequency of execution of each instruction or code fragment to a predetermined threshold, and if the determined frequency of execution exceeds the threshold, collecting state changes relating to that instruction or code fragment and marking that instruction or code fragment;
means for identifying marked instructions or code fragments as potential candidates for "fast forwarding" to a time T by analyzing the collected state changes related to those marked instructions or code fragments and determining that the execution of those marked instructions or code fragments is cyclic; and
means for generating a function g to be applied at next and subsequent times the identified instructions or code fragments are executed in which the application of function g at a time t provides accelerated advancement through the code fragments and produces a same result when compared to applying a next state function repeatedly until time T is reached, wherein the means for generating generates the function g by computing state changes from a state s(t) from execution of a code fragment and events that will occur in future en(tn), where en represents an event occurring at time tn and n is an integer index such that a time t2 is greater than a time t1.

11. The system according to claim 10 wherein, the system further comprises means for generating a function m for calculating the minimum of a number of iterations of loops of the code fragments that will be executed before any interrupts occur such that t max is determined which is the maximum value of T for which the function g is applied and conditions are fulfilled when a loop is exited.

12. The system according to claim 11 wherein, the system further comprises means for generating a function h that uses the function m for determining whether a state s(t) is a suitable candidate for applying the function g on.

13. The system according to claim 11 wherein, the system comprises a state queue that comprises all states in the simulated digital computer system at time t, which includes register contents at time t, memory contents at time t, and disk contents at time t.

14. The system according to claim 10 wherein, the system comprises a Next State Generator (NSG) for generating a new state s'(t) from a previous state s(t) by simulating a next instruction.

15. The system according to claim 10 wherein, the system comprises an event queue (EQ) which store the events en(tn) relating to a plurality of events that will occur in the future.

16. The system according to claim 12 wherein, the system comprises a memory management unit MMU that defines a mapping of a virtual address to a physical address is added to the state s(t), and wherein the function h is adapted to check the MMU.

17. A computer program code stored on a computer readable medium and capable of being run on a host system for simulating in software a digital computer system, the simulation results in a simulated state of said computer system accessible to a user, the computer program code when run on the host system implementing the process steps comprising:
determining a frequency of execution of each instruction or code fragment of a set of instructions or code fragments of a simulation session;
comparing the determined frequency of execution of each instruction or code fragment to a predetermined threshold, and if the frequency of execution exceeds the threshold, collecting state changes relating to that instruction or code fragment and marking that instruction or code fragment;
identifying marked instructions or code fragments as potential candidates for "fast forwarding" to time T by analyzing the corresponding collected state changes related to those marked instructions or code fragments and determining that the execution of those instructions or code fragments is cyclic; and
generating a function g to be applied at next and subsequent times the identified instructions or code fragments are executed in which application of function g at a time t provides accelerated advancement through the code fragments and produces the same result when compared to applying a next state function repeatedly until time T is reached, wherein the function g is generated by computing state changes from a state s(t) from execution of a code fragment and events that will occur in future en(tn), where en represents an event occurring at time tn and n is an integer index such that a time t2 is greater than a time t1.

18. The computer program code according to claim 17 wherein, the computer program code is operable to be run on the host system independently of operating system.

19. The computer program code according to claim 17 wherein, the computer program code is operable to simulate a plurality of multi-processor machines or networks comprising several computers.

* * * * *